April 12, 1938.  H. A. HENSEL  2,114,077
MEANS FOR CLOSING SAUSAGE CASINGS
Filed May 23, 1936   2 Sheets-Sheet 2

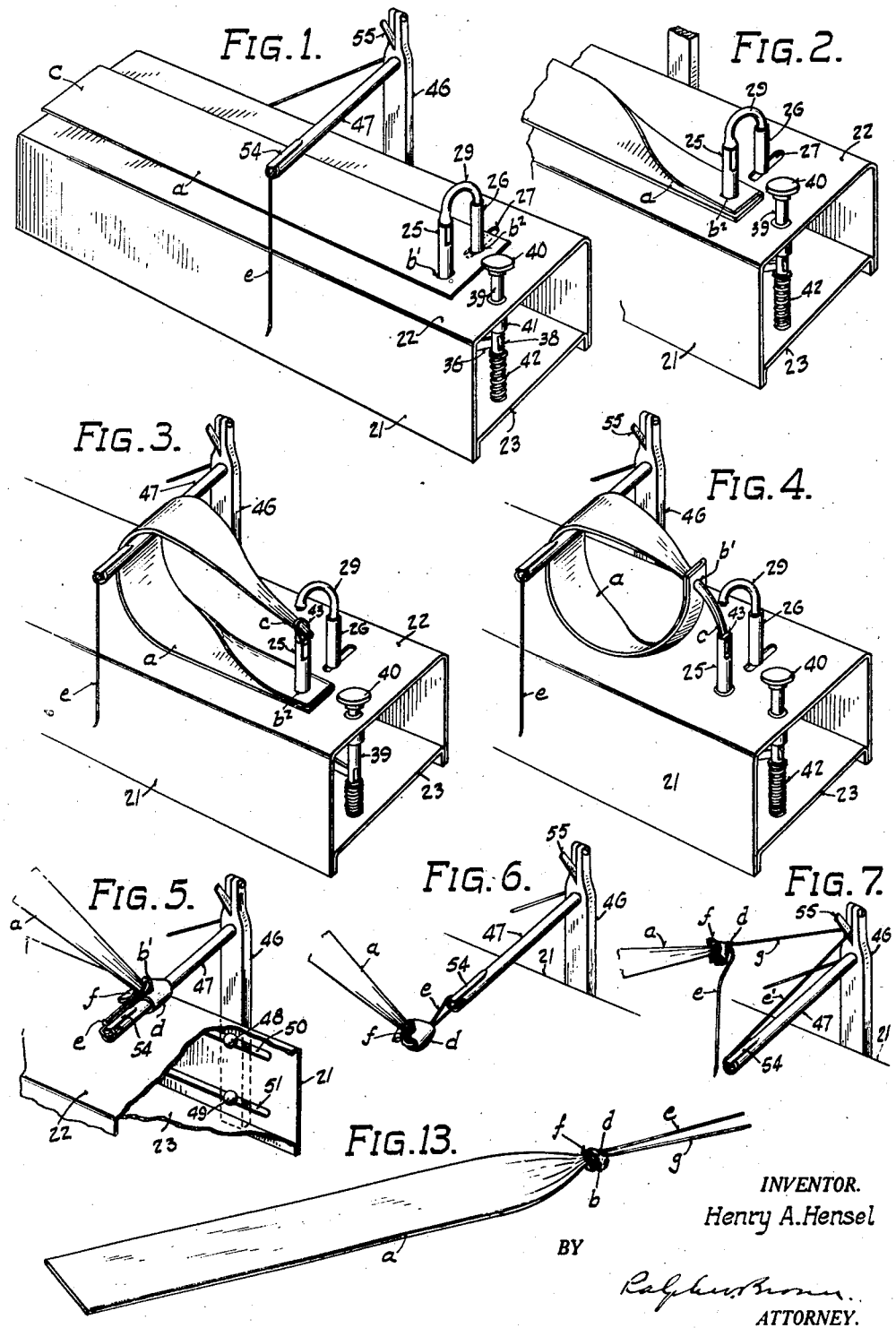

INVENTOR.
Henry A. Hensel
BY
ATTORNEY.

Patented Apr. 12, 1938

2,114,077

UNITED STATES PATENT OFFICE 2,114,077

MEANS FOR CLOSING SAUSAGE CASINGS

Henry A. Hensel, Milwaukee, Wis., assignor to The Visking Corporation, Chicago, Ill., a corporation of Virginia Application May 23, 1936, Serial No. 81,431

14 Claims. (Cl. 17—34)

This invention is a machine for tying sausage casings, more particularly for use in knotting and tying the ends of sausage casings to securely close the same and provide a supporting means therefor.

A novel form of sausage casing, and a method by which such casing may be tied into a knot to securely close the end of the casing, is disclosed in my copending application, Serial No. 53,326, filed December 7, 1935, now Patent No. 2,042,227, issued May 26, 1936. In that application is described a sausage casing having one end of the material perforated, and a method of closing the end of the casing by drawing the main portion of the casing through the perforations, to form a tight, secure knot in the material of the casing, through which a cord passes for hanging the sausage after it is stuffed.

One object of the present invention is to provide a machine for use in closing a sausage casing preparatory to stuffing the same.

Another object is to provide a machine for use in knotting the material of a sausage casing to close the same and incorporating in the knot a tie or hanger to support the sausage after stuffing.

Another object is to provide a machine for knotting or tying a sausage casing preparatory to stuffing.

Another object is to provide an improved knot or closure for a sausage casing.

Other more specific objects and advantages will appear, either expressed or implied, from the following description of an illustrative embodiment of the present invention.

In the accompanying drawings, showing an illustrative embodiment of this invention:—

Figure 1 is a view in perspective of a machine showing a stack of flat perforated casings in position for knotting.

Figs. 2, 3, 4, 5, 6, and 7 are similar fragmentary views illustrating various stages in the use of the machine.

Fig. 13 is a perspective view of a sausage casing with a knot formed by the use of the machine shown.

Figure 8:
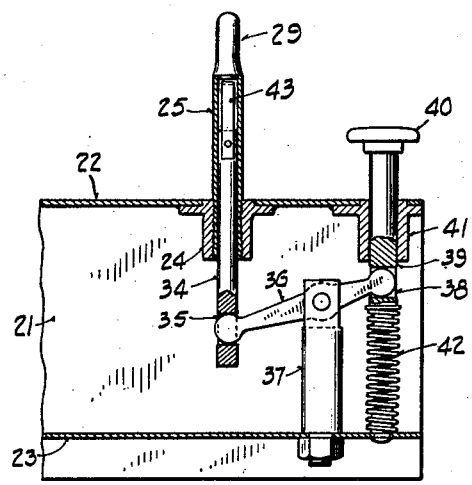
Fig. 8 is a longitudinal sectional view through a portion of the machine.

In all of the figures of the drawings, the numeral 21 designates a base or frame upon which the other parts of the machine are mounted. This frame is made preferably in the form of a rectangular box-like structure, open at each end, having a flat top or table 22 to serve as a work table upon which the casings may be stacked preparatory to knotting, and a base 23 formed preferably of a piece of metal sufficiently heavy to give stability to the machine during operation.

Some means is preferably provided for positioning the casings to be tied, upon the table 22. In this case such means takes the form of two tubular posts 25 and 26 projecting from the table 22. Attached to the under side of the table 22 near one end is a bushing 24. The tube 25, projecting upwardly from the table 22, has its lower end screwed into the bushing 24 so that the tube is readily removable from the machine.

The second tube 26 of like diameter projects upwardly from the table 22 of the frame a short distance to one side of the tube 25. Tube 26 seats upon the table 22 and is closed at its lower end by a plug 26′, whose reduced lower end projects through a slot 27 in the table 22 and is threaded to receive a wing nut 28, which serves to clamp the plug 26′ and tube 26 to the table 22. By this arrangement the tube 26 may be adjusted laterally with respect to the tube 25 so as to vary the spacing therebetween.

The sausage casings $a$ to be tied on the machine are of a type disclosed in the application identified above, and consist of a flattened tube having laterally spaced perforations $b'$ and $b^2$ formed near one end thereof. A group of these casings $a$, rendered soft and flexible by soaking or otherwise, are stacked upon the table 22, with their perforations $b'$ and $b^2$ threaded over the tubes 25 and 26, respectively. The machine can be adjusted to fit the spacing between the holes $b'$ and $b^2$, by adjusting the tube 26 relative to the tube 25. Likewise the tubes are readily removable from the machine, by removing the wing nut 28 from the plug 26′, and by unscrewing the tube 25 from the bushing 24; and so may easily be replaced with other tubes of different diameters above the table 22, to accommodate casings having holes of a different size. The stack of casings is positioned on the table by coaction of the perforations and the tubes.

Figure 10:
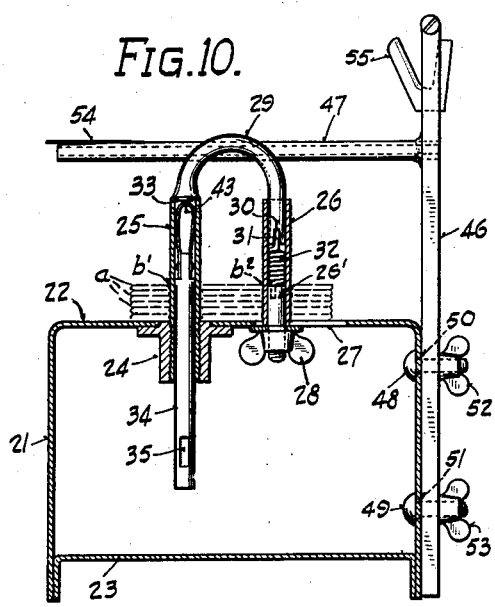
Figs. 10 and 11 are transverse sectional views.
Figure 11:
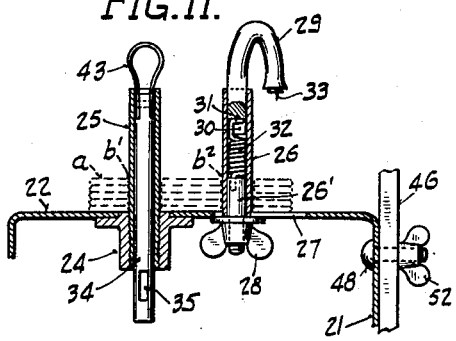

In Figs. 10 and 11 of the drawings, a stack of casings $a$ is shown in position on the table 22. In Figs. 1 to 7, however, only a single casing $a$ is shown, to simplify the illustration of the steps involved in the tying operation.

After the casings $a$ are stacked upon the table 22 over the tubes 25 and 26, the tubes are preferably bridged by an appropriate guide, herein shown as a goose-neck 29, to facilitate the folding operation. In this instance the goose-neck is removably journalled at one end in the upper end of the tube 26, the journalled end being provided with a slot 30, adapted to receive a cross-member or loop 31 formed at the upper end of a coil spring 32 arranged within the tube 26. The lower end of the spring 32 is anchored in the plug 26' at the lower end of the tube 26. At its opposite end, the goose-neck 29 has formed on its tip a shallow projection 33 of reduced diameter, formed to fit within and to engage the top of the tube 25, so as to releasably retain the goose-neck in position to bridge the tubes as indicated in Figs. 1, 2, and 10.

The goose-neck 29 is of course removable by merely lifting it from the tubes 25 and 26, to permit stacking of the casings over the tubes. The goose-neck is readily replaceable in the machine by inserting first the end carrying the slot 30 into the tube 26, while holding the goose-neck in the position shown in Figs. 3, 4, and 11, parallel to the length of the machine and at right angles to the line of the tubes 25 and 26. The slot 30 in the goose-neck, and the loop 31 of the spring 32 are so formed that they will readily engage each other when the goose-neck is inserted in this position into the tube 26. By then turning the goose-neck in the tube 26, its other end, carrying the projection 33, may be inserted in the tube 25, the slight turn setting up a torsional stress in the spring 32 for the purposes to be shown later. Being removable, the goose-neck may of course be replaced by others of a different length to fit the variable distance between the adjustable tubes 25 and 26.

With the goose-neck 29 and the casings in the position shown in Fig. 1, the top casing $a$ of the stack may very readily be folded in the manner shown in Fig. 2, by slipping the half containing the hole $b^2$ from the tube 26 over the goose-neck onto the tube 25 so that the holes $b'$ and $b^2$ now coincide.

In the next step of the operation of tying the casings, some means is required for fastening the opposite end $c$ of the sausage casing $a$ to the tube 25. In the machine shown in the drawings, the gripping mechanism includes a slide rod 34 carried within the tube 25, and having a slot 35 near its lower end. Engaged in this slot 35 is one end of a lever 36, rockably mounted upon a support, such as the post 37 secured to the base 23 of the frame. The other end of the lever 36 engages a similar slot 38 in an operating stem 39, slidable vertically through the table 22 and carrying at its top an operating knob 40. This stem 39 is guided by a bushing 41 attached to the under side of the table 22. A compression spring 42 between the base 23 and the lower end of stem 39 resists downward movement of the stem and the end of the lever 36 engaged therewith, and thus tends to maintain the slide rod 34 at the bottom of its stroke within the tube 25.

Figure 12:
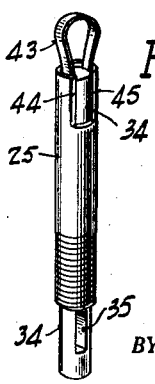
Fig. 12 is a perspective view on a larger scale of a casing gripper mechanism employed.

Upon the upper end of the rod 34 is carried a loop 43, preferably comprising a ribbon of spring steel of a width which may be most conveniently accommodated within the tube 25. This loop 43 is moveable in and out of the tube 25, being guided by narrow flanges 44 formed by turning back the edges remaining when a portion of one side of the tube 25 is cut away, as shown in Fig. 12, to leave a recess or cut-out portion 45 for the purposes described below.

Figure 9:
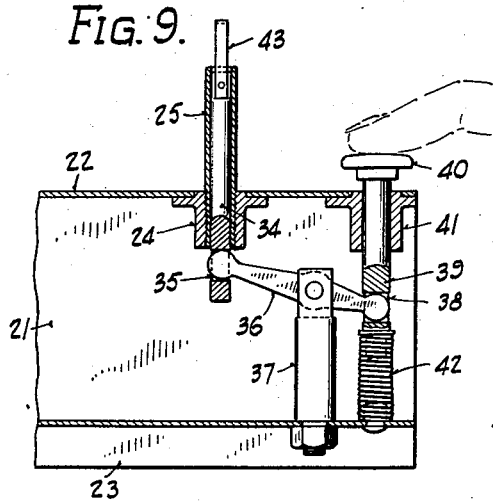
Fig. 9 is a similar view to Fig. 8, but illustrating a later stage in the operation of the machine.

Pressure upon the knob 40 causes the rod 34 to slide upwardly within the tube 25, and thus raises the loop 43 up out of the end of the tube 25, as shown in Figs. 9 and 11 of the drawings. By confinement within the tube 25, the sides of the loop 43 are held compressed, keeping the loop relatively long and narrow. As the loop is raised above the tube, however, it spreads out to increase the width of the eye of the loop. The loop is mounted so that the openings of the eye face the ends of the machine.

During its ascent, the loop 43 strikes and raises the end of the goose-neck 29 so as to disengage the projection 33 from the tube 25, whereupon the goose-neck swings away from the tube 25, under the torsional stress of the spring 32 into its original position parallel to the length of the machine.

Intermediate the ends of the frame 21, there is moveably secured to one side of the frame an upright arm 46, carrying a horizontal tube 47 extending substantially across the width of the frame 21 and over the stacked casings $a$, substantially parallel to and above the table 22. This tube 47 serves as a guide around which the casing may be folded and knotted, and also as a guide for a cord or string which is subsequently incorporated into the knot, in a manner to be hereinafter described.

The upright arm 46 is adjustably secured to the frame 21, preferably by two bolts 48 and 49 which extend through two vertically spaced horizontal slots 50 and 51 formed in the side of the frame 21. Two wing nuts 52 and 53, screwed onto the bolts, tighten the arm 46 against the frame and hold it in position. By loosening the wing nuts, the arm 46 and the guide tube 47 may be moved to various positions to accommodate casings of various lengths.

As the next step in the knotting of a casing, the opposite or unperforated end $c$ of the casing $a$ is brought up over the guide tube 47, as shown in Fig. 3 of the drawings, and the end, slightly compressed if necessary, is passed into the eye of the loop 43, which is held in exposed position above the tube 25 by pressure on the knob 40. Upon releasing this pressure, the force of the spring 42 draws the loop 43 and the contained casing end down into the tube 25, a portion of the tube being cut away, as at 45, to permit the tip end of the casing to swing or fold into the end of the tube under the downward and confining pressure of the loop 43. By properly adjusting the position of arm 46 and guide tube 47, the end $c$ of the casing can be made to pass through the loop 43 to just the extent necessary to secure the best results with the particular size of casing being used.

With the end $c$ of the casing thus confined in the end of the tube 25, the perforated end of the casing may be drawn up off the tube 25 over the end $c$ of the casing, which is thus caused to pass through the perforations $b'$ and $b^2$ as shown in Fig. 4, forming a loop $d$ in the casing. The remainder of the casing may then be drawn through the perforated end until the loop $d$, formed by the casing, is close around the guide tube 47, as shown in Fig. 5. The end $c$ of the casing may be freed from the metal loop 43 by a slight pull, and the loop 43 will be withdrawn by the spring 42 into the tube 25, in readiness for the folding of the next casing.

For the purpose of incorporating a cord into the knot of the casing, a string or cord from an appropriate source extends through the guide tube 47, with an end strand e thereof hanging from the free end of the tube. After the casing loop d has been pulled closely around the guide tube, as in Fig. 5, the strand e of the cord is carried up and passed one or more times around the neck of the casing, close to the point where it passes through the perforated end, as indicated at f. The end of the strand e is then forced beneath a spring clip 54, fixed to the guide tube 47 near its end and projecting beyond the tube to facilitate entry of the strand between it and the tube.

The loop d of the casing may then be drawn off the end of the guide tube 47, over the end of the strand e held by the clip 54. Both the strand e and the main portion of the cord are thus caused to pass through the loop d of the casing from the loop f of the cord around the casing. The loop d of the casing may then be tightened into a secure, compact knot, and the cord tightened to reinforce the knot.

A pull upon the knotted casing away from the machine will then draw forth through the guide tube 47 a fresh length of cord, which may be passed back and over a cutter blade 55, fixed in convenient position at the top of the upright arm 46, in a manner to sever the cord, and to leave the strand g attached to the casing and the strand e' hanging from the end of the tube in readiness for another casing.

The casing a will then appear as in Fig. 13, with the material thereof securely tied into the knot d the body of the casing passing through the perforations b, the cord being wound about the casing to form the wrapping f, and the two strands e and g passing through the knot d, so that tension upon the strands will tighten the wrapping f about the casing.

The machine may be used to produce a modified form of knot, if desired, requiring no perforations in the casing. In such case, the end c of the casing a is merely folded over the guide tube 47 to produce a small loop d, and the end strand e of the cord passed once or more times around the body of the casing and the end portion c to bind them together. If preferred, the cord may be passed once or more times around the body of the casing alone, and then once or more around the body of the casing and the end portion c together. In either event, the knot is completed by engaging the strand e in the clip 54 and drawing the loop d of the casing off the guide tube 47 over the cord and end strand e, as set forth above. Tightening of the loop d around the cord, and tightening of the wrapping f around the casing by pulling the end strands, produces a secure, compact knot, with the end strands of the cord running through the knot. The cord may then be severed in the manner described above.

Various changes may be made in the embodiments of the invention hereinabove specifically described without departing from or sacrificing the invention as defined in the appended claims.

I claim:—

1. In a machine for closing a tubular sausage casing the combination of a member insertable through a portion of said casing, and means coacting with said member for receiving and directing another portion of said casing through said first named portion.

2. In a machine for closing a tubular sausage casing the combination of a member insertable through a portion of said casing, and means for releasably securing another portion of said casing to said member to direct said last named portion through said first named portion.

3. In a machine for closing a tubular sausage casing the combination of a rod insertable through the material of a portion of said casing, and an element carried by said rod for grasping another portion of said casing to effect introduction of said last named portion through said first named portion.

4. In a machine for closing a tubular sausage casing the combination of a tubular member insertable through a portion of said casing, and means operable through said member for receiving and directing another portion of said casing through said first named portion.

5. In a machine for closing a tubular sausage casing the combination of a hollow member insertable through a portion of said casing, and means for directing a second portion of said casing through said first named portion, said means including an element projectable from said member to receive said second portion of said casing and retractable toward said member to thereby releasably secure said second portion to said member.

6. In a machine for closing a tubular sausage casing the combination of a hollow member insertable through a portion of said casing, and means moveable in and out of said member, said means being confined when within said member and expansible outside of said member to receive a second portion of said casing, said means coacting with said member to secure said second portion to said member, and to introduce said second portion through said first named portion.

7. In a machine for closing a tubular sausage casing the combination of a member insertable through a portion of said casing, means coacting with said member to receive and direct another portion of said casing through said first named portion, and means coacting with the casing to position said other portion thereof relative to said first named means.

8. In a machine for closing a tubular sausage casing, the combination of a rod insertable through the material of a portion of said casing, an element carried by said rod operable to grasp another portion of said casing to introduce the same through said first named portion, and an adjustable guide rod over which said casing may be folded to determine the position of said other portion of said casing relative to said element.

9. In a machine for closing a tubular sausage casing, the combination of a tubular member insertable through the material of a portion of said casing, and means for directing a second portion of said casing through said first named portion, said means including an element projectable from said member to receive said second portion of the casing, and means operating through said member for projecting said element from said member and for retracting said element toward said member to secure said second casing portion to said member.

10. In a machine for closing a tubular sausage casing the combination of a member insertable through the material of said casing and disposed to receive adjacent folds of said casing threaded over said member, and means coacting with said first named means for introducing another portion of said casing through the first named folds of said casing.

11. In a machine for closing a tubular sausage casing the combination of a member insertable through the material of said casing and disposed to receive thereon a portion of said casing, means for directing another portion of said casing onto said member into superposed relation with the first named portion, and means coacting with said member to direct a further portion of said casing through said superposed portions.

12. In a machine for closing a tubular sausage casing the combination of a member insertable through the material of said casing and disposed to receive thereon a portion of said casing, and means for directing another portion of said casing onto said member into superposed relation with said first named portion.

13. In a machine for closing a tubular sausage casing the combination of a member insertable through a portion of said casing, a member insertable through another portion of said casing, and means coacting with said members to direct the said portions of the casing into folded alignment.

14. In a machine for closing a tubular sausage casing the combination of means for directing one portion of said casing through another portion of said casing to thereby form a knot, and means for incorporating a cord in said knot.

HENRY A. HENSEL.